(12) United States Patent
Gorgoglione (10) Patent No.: US 11,273,549 B1
(45) Date of Patent: Mar. 15, 2022

(54) TUBE WITH HORIZONTAL AND VERTICAL ALIGNMENT GUIDE LINES

(71) Applicant: John Gorgoglione, Staten Island, NY (US)

(72) Inventor: John Gorgoglione, Staten Island, NY (US)

(*) Notice: Subject to any disclaimer, the term of this patent is extended or adjusted under 35 U.S.C. 154(b) by 112 days.

(21) Appl. No.: 16/924,474

(22) Filed: Jul. 9, 2020

Related U.S. Application Data (60) Provisional application No. 62/902,466, filed on Sep. 19, 2019.

(51) Int. Cl.
*B25H 7/00* (2006.01)
*B21D 7/14* (2006.01)

(52) U.S. Cl.
CPC .............. *B25H 7/005* (2013.01); *B21D 7/14* (2013.01)

(58) Field of Classification Search
None
See application file for complete search history.

(56) References Cited

U.S. PATENT DOCUMENTS

| | | | |
|---|---|---|---|
| 948,523 A | 2/1910 | Perkins | |
| 2,531,077 A | 11/1950 | Mullin | |
| 2,637,114 A * | 5/1953 | McHugh | F24F 7/04 33/529 |
| 2,735,190 A | 2/1956 | Jordan et al. | |
| 2,950,536 A * | 8/1960 | Hellwig | B21D 7/14 33/413 |
| 3,060,587 A * | 10/1962 | Picken | B21D 7/0225 33/529 |
| 3,128,560 A * | 4/1964 | McKenzie | B25H 7/00 33/529 |
| 3,209,459 A * | 10/1965 | Fish, Jr. | F16L 41/02 33/562 |
| 3,728,796 A | 4/1973 | Lobaugh | |
| 3,800,421 A * | 4/1974 | Sauer | B25H 7/005 33/22 |
| 3,949,481 A | 4/1976 | Campbell | |
| 5,499,521 A * | 3/1996 | Luikart | B21D 7/024 72/149 |
| 7,251,902 B1 * | 8/2007 | Mueller | F16L 1/06 33/529 |
| 7,350,311 B2 * | 4/2008 | Marks | B43L 13/20 33/1 B |

(Continued)

FOREIGN PATENT DOCUMENTS

| | | | | |
|---|---|---|---|---|
| CN | 105014641 B | * | 3/2017 | |
| GB | 2288349 A | * | 10/1995 | B05C 17/00 |
| WO | WO-2014020353 A1 | * | 2/2014 | F16L 1/10 |

*Primary Examiner* — Christopher W Fulton
(74) *Attorney, Agent, or Firm* — Goldstein Law Offices, P.C.

(57) ABSTRACT

A bendable tube having pre-marked horizontal and vertical alignment guides which allow a user to form successive bends of the tube in the same plane. The horizontal and vertical alignment guides are coplanar with a horizontal plane and a vertical plane which axially bisect the tube and are perpendicular to each other. The horizontal and vertical alignment guides allow the tube to be precisely aligned within a bending apparatus, ensuring that the horizontal alignment guides remain coplanar with the horizontal plane when performing a horizontal bend, and that the vertical alignment guides remain coplanar with the vertical plane when performing a vertical bend.

11 Claims, 7 Drawing Sheets

(56) References Cited

U.S. PATENT DOCUMENTS

| | | |
|---|---|---|
| 7,624,511 B1 | 12/2009 | Schmidt |
| 7,926,196 B2* | 4/2011 | Mueller ................ B43L 13/205 |
| | | 33/529 |
| 9,937,617 B2 | 4/2018 | Martin |
| 2018/0056360 A1* | 3/2018 | Williams .................. F16L 1/10 |

* cited by examiner

TUBE WITH HORIZONTAL AND VERTICAL ALIGNMENT GUIDE LINES

CROSS-REFERENCE TO RELATED APPLICATIONS

This application claims the benefit of priority of U.S. Provisional Patent Application Ser. No. 62/902,466, filed on Sep. 19, 2019, the contents of which are relied upon and incorporated herein by reference in their entirety.

TECHNICAL FIELD

The present disclosure relates generally to a tube suitable for use as a pipe or conduit. More particularly, the present disclosure relates to a tube having pre-marked alignment guide lines to facilitate precise and consistent bending of the tube.

BACKGROUND

Bendable tubes are employed as conduits in the electrical trade to protect and route electrical wiring in buildings or other structures. Electricians will typically bend or shape the conduits at a job site to suit the needs of the job at hand. Conduits must be bent precisely to ensure proper linkage with other conduits or devices, and improperly bent or shaped conduits result in a waste of time and materials.

Various devices may be found within the prior art which seek to facilitate the precise bending of tubes in various applications. These devices employ various leveling techniques, templates, or measuring apparatuses which allow a user to inscribe markings upon the tube. However, these devices are cumbersome and time consuming to use.

Accordingly, there is a need for a bendable tube having pre-marked guide lines which allow a user to quickly and efficiently perform consistent and precise bends in the same plane.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a tube with markings adapted to allow a user to bend the tube with precision and consistency. Accordingly, the present disclosure provides a tube comprising a tube with a tube wall having an outer surface, and a pair of horizontal alignment guides and a pair of vertical alignment guides disposed on the outer surface. The horizontal alignment guides are coplanar with a horizontal plane which axially bisects the tube, while the vertical alignment guides are coplanar with a vertical plane which axially bisects the tube and is perpendicular with the horizontal plane. The tube may be bent in a horizontal bend direction which points away from the vertical plane and aligns with the horizontal plane, or in a vertical bend direction which points away from the horizontal plane and aligns with the vertical plane. Precision and consistency are ensured by maintaining the vertical or horizontal alignment guides in coplanar arrangement with the vertical or horizontal planes, as appropriate, while the tube is bent.

Another aspect of an example embodiment in the present disclosure is to provide a tube which is adapted to be employed with a bending apparatus. Accordingly, the tube is adapted for use with a bending apparatus having a cradle which allows the tube to be bent. The cradle is bisected by a cradle central plane. The tube is bent in the horizontal bend direction by arranging the vertical plane perpendicularly with a cradle central plane with the aid of the vertical alignment guides. The tube is bent in the vertical bend direction by arranging the horizontal plane perpendicularly to the cradle central plane using the horizontal alignment guides.

It is a further aspect of an example embodiment in the present disclosure to allow the horizontal and vertical alignment guides to be visually distinguished by the user. Accordingly, the horizontal alignment guides are formed using a first color, while the vertical alignment guides are formed using a second color.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
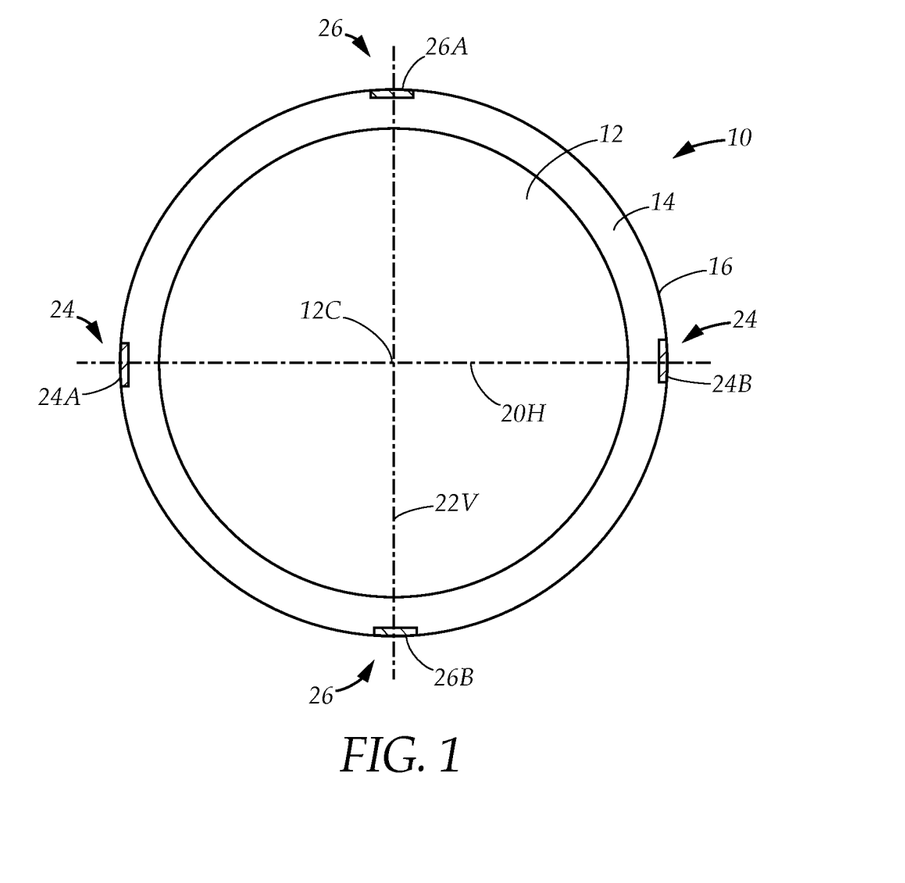
FIG. 1 is diagrammatical cross section view of a tube with a tube wall, a pair of horizontal alignment guides aligned with a horizontal plane, and a pair of vertical alignment guides aligned with a vertical plane, in accordance with an embodiment in the present disclosure.
Figure 2:
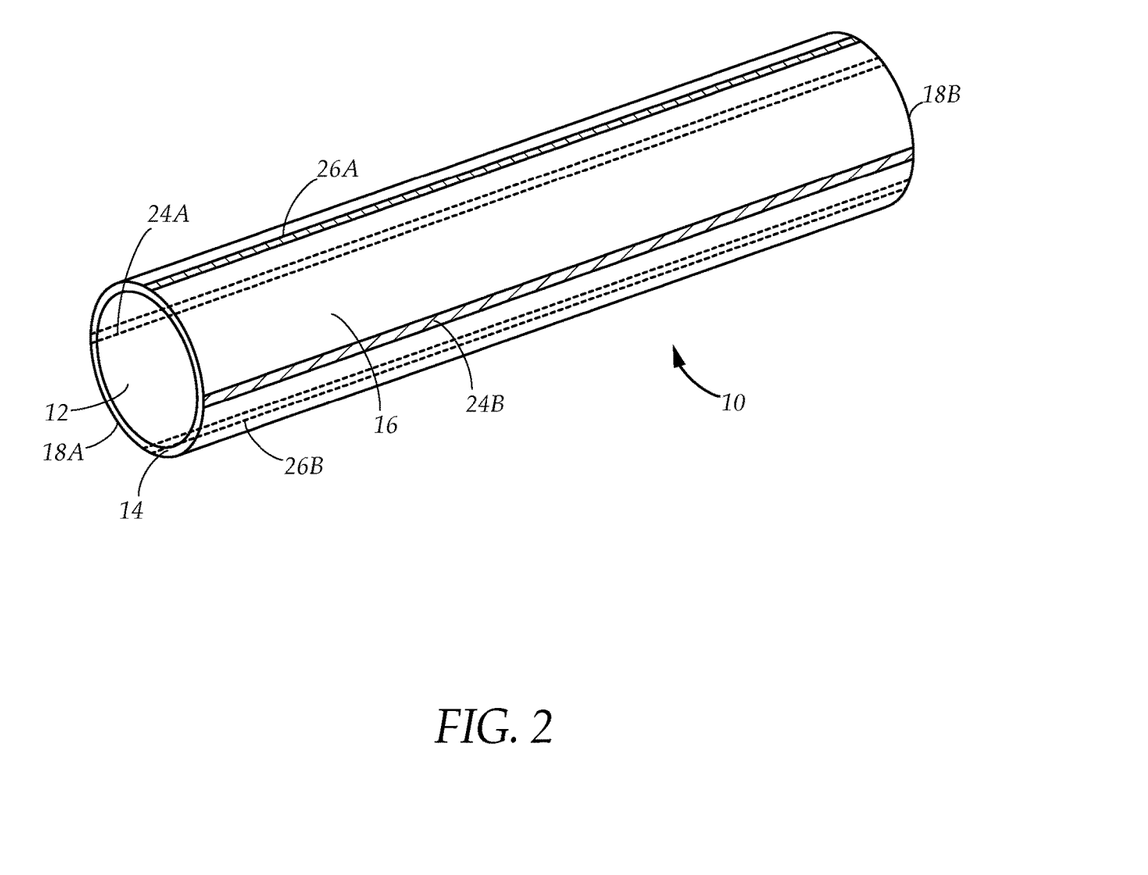
FIG. 2 is a diagrammatical perspective view of the tube, showing the horizontal and vertical alignment guides extending from a tube first end to a tube second end, in accordance with an embodiment in the present disclosure.

FIGS. 1 and 2 illustrate a tube 10 comprising a tube first end 18A, a tube second end 18B, and a tube wall 14 which extends between the tube first and second ends 18A, 18B. The tube wall 14 is substantially hollow, and encloses a tube inner space 12 which passes from the tube first end 18A to the tube second end 18B. The tube wall 14 further has an outer surface 16. The tube 10 may be a conduit or pipe used for electrical, wiring, plumbing, construction, or other applications. The tube 10 may be formed of metal, or in some cases, plastic or PVC. The tube 10 is axially divided by a vertical plane 22V passing through a center point 12C within the tube inner space 12, and a horizontal plane 20H which passes through the center point 12C perpendicularly to the vertical plane 22V. The tube 10 further has a pair of vertical alignment guides 26 positioned on the outer surface 16 which are coplanar with the vertical plane 22V, and a pair of horizontal alignment guides 24 positioned on the outer surface 16 which are coplanar with the horizontal plane 20H. The tube 10 is capable of being bent by applying pressure to the tube wall 14 between the tube first and second ends 18A, 18B, and the horizontal and vertical alignment guides 24, 26 are adapted to aid a user in bending the tube 10 with consistency and precision.

In a preferred embodiment, the vertical and horizontal alignment guides 26, 24 are lines which extend from the tube first end 18A to the tube second end 18B. The pair of vertical alignment guides 26 includes a first vertical alignment guide 26A and a second vertical alignment guide 26B which are separated from each other by one hundred and eighty degrees along the circumference of the tube wall 14. Similarly, the pair of horizontal alignment guides 24 includes a first horizontal alignment guide 24A and a second horizontal alignment guide 24B which are separated from each other by one hundred and eighty degrees. The first and second horizontal alignment guides 24A, 24B are each interposed between the vertical alignment guides 26, and are each separated from the first and second vertical alignment guides 26A, 26B by ninety degrees. The vertical and horizontal alignment guides 26, 24 are pre-marked on the tube outer surface 16 at the time of manufacture, may be formed by marking the outer surface 16 using paint, ink, decal tape, or any other suitable method for creating persisting marks on metal or plastic. In certain embodiments, the vertical alignment guides 26 are formed using a first color, while the horizontal alignment guides 24 are formed using a second color, thus allowing the vertical and horizontal alignment guides 26, 24 to be visually distinguished by the user.

Figure 3A:
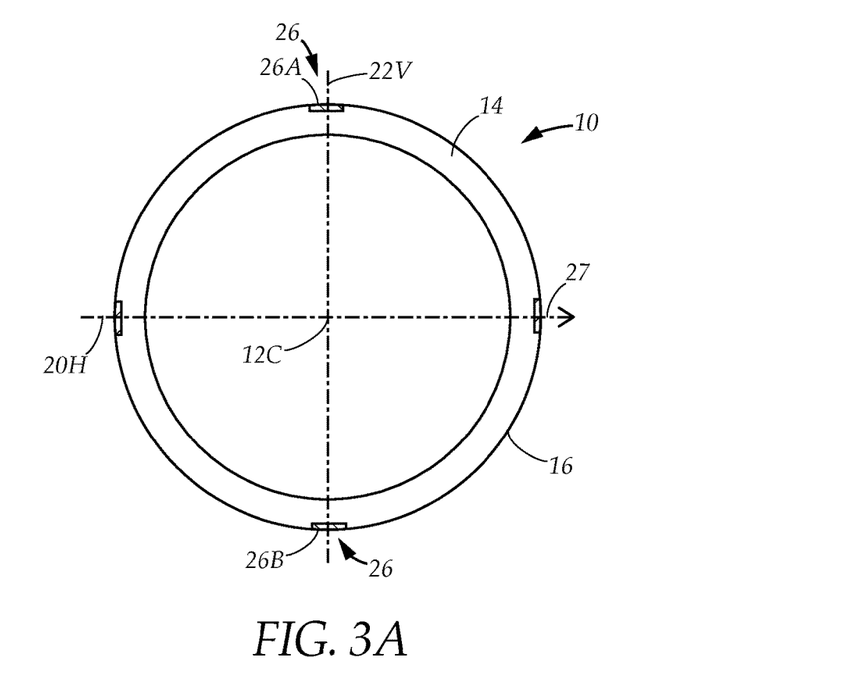
FIG. 3A is a diagrammatical cross section view of the tube, showing a horizontal bend direction which points away from the vertical plane and is aligned with the horizontal plane, in accordance with an embodiment in the present disclosure.
Figure 3B:
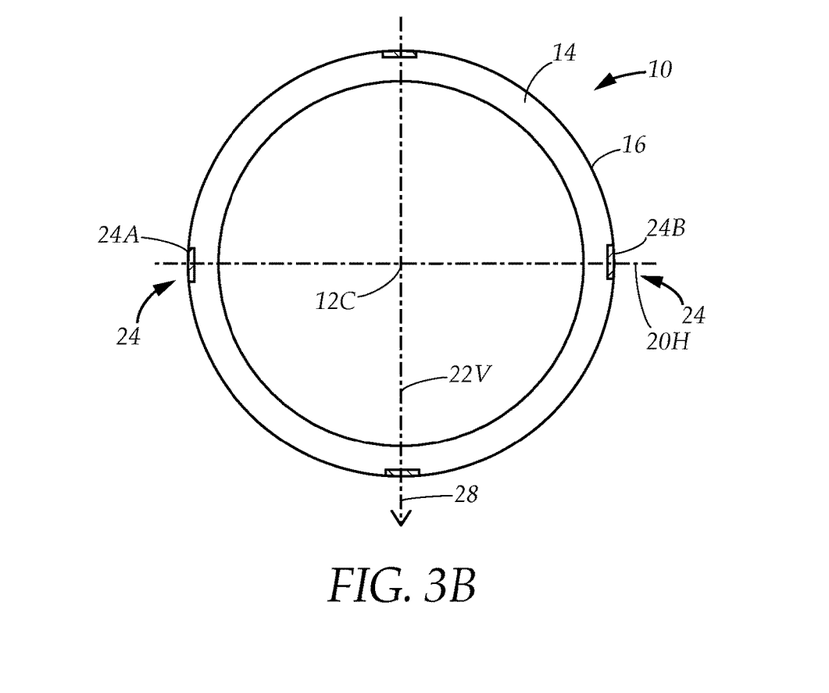
FIG. 3B is a diagrammatical cross section view of the tube, showing a vertical bend direction which points away from the horizontal plane and is aligned with the vertical plane, in accordance with an embodiment in the present disclosure.
Figure 3C:
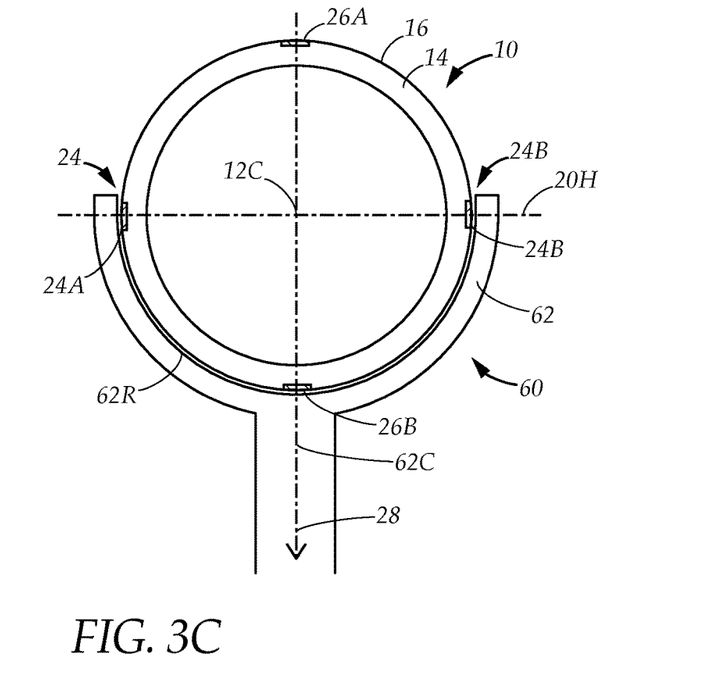
FIG. 3C is a diagrammatical cross section view of the tube and a bending apparatus, the tube being engaged within a cradle, in accordance with an embodiment in the present disclosure.
Figure 3D:
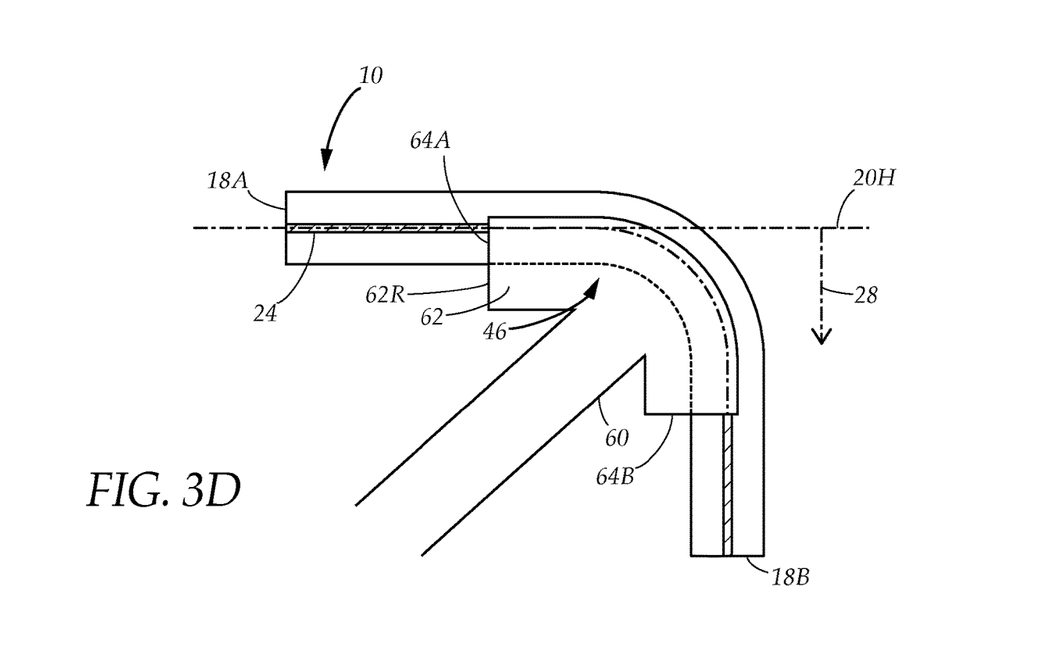
FIG. 3D is a diagrammatical side view of the tube being bent using the bending apparatus, in accordance with an embodiment in the present disclosure.

Turning to FIGS. 3A and 3B, the vertical alignment guides 26 are adapted to guide the user in bending the tube 10 in a horizontal bend direction 27 which points away from the vertical plane 22V and is aligned with the horizontal plane 20H. The horizontal alignment guides 24 are adapted to guide the user in bending the tube 10 in a vertical bend direction 28 which points away from to the horizontal plane 20H and is aligned with the vertical plane 22V. Referring to FIGS. 3C and 3D while continuing to refer to FIGS. 3A and 3B, in a preferred embodiment, the tube 10 is adapted to be bent using a bending apparatus 60, such as a portable conduit bender, conduit or pipe bending machine, or other similar apparatus. The bending apparatus 60 has a cradle 62 with a cradle first end 64A, a cradle second end 64B, and a cradle recess 62R which is concave in shape and faces outwardly. The cradle recess 62R further has a cradle central plane 62C, which centrally divides the cradle recess 62R between the cradle first and second ends 64A, 64B. The cradle recess 62R is adapted to allow the tube 10 to be placed longitudinally therein, with the tube first end 18A oriented towards the cradle first end 64A, and the tube second end 18B oriented towards the cradle second end 64B. Furthermore, the cradle 62 is curved, with the cradle second end 64B curving away from the cradle first end 64A in a direction opposite to the cradle recess 62R. The user may utilize the bending apparatus 60 to bend the tube 10 by placing pressure on the tube second end 18B, causing the tube second end 18B to bend towards the cradle second end 64B.

Figure 4A:
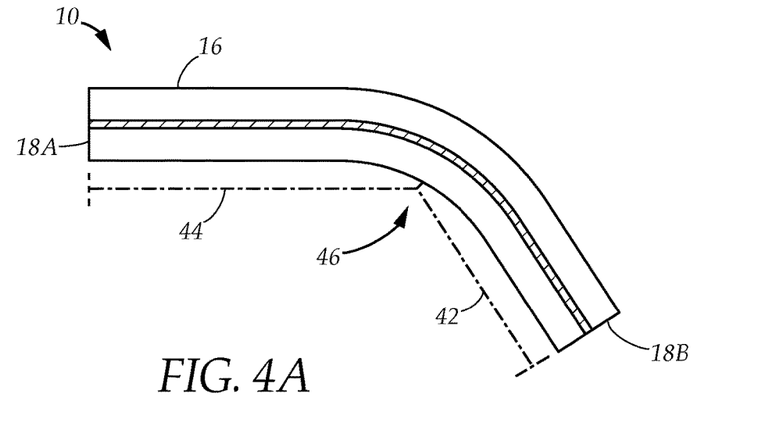
FIG. 4A is a diagrammatical side view of the tube, showing a bend point, a bent portion, and a preceding portion, in accordance with an embodiment in the present disclosure.
Figure 4B:
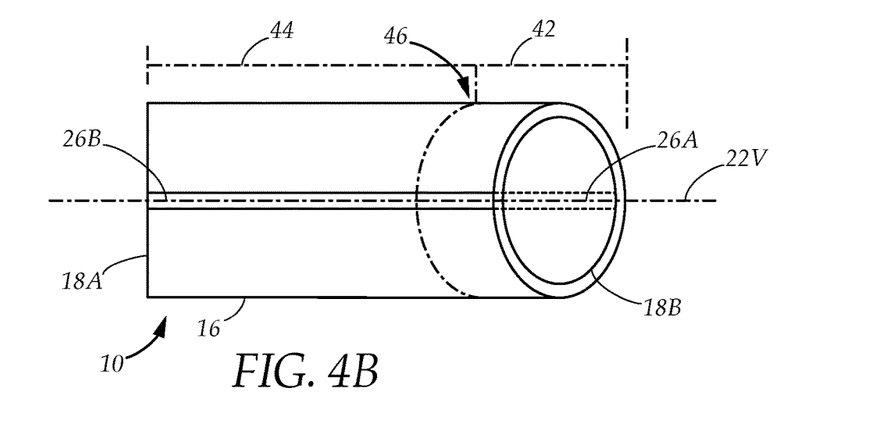
FIG. 4B is a diagrammatical bottom view of the tube with the tube bent in a vertical direction, showing the vertical alignment guides aligned with the vertical plane, in accordance with an embodiment in the present disclosure.

Referring to FIG. 3C, while continuing to refer to FIGS. 3A, 3B, and 3D, to ensure that the tube 10 is bent precisely, the horizontal and vertical alignment guides 24, 26 allow the tube 10 to be properly aligned within the cradle recess 62R. To bend the tube 10 in the vertical bend direction 28, the tube 10 is positioned within the cradle recess 62R such that the horizontal plane 20H, as indicated by the horizontal alignment guides 24, is perpendicular to the cradle central plane 62C. The user may then bend the tube second end 18B towards the cradle second end 64B. The perpendicular alignment of the horizontal plane 20H with the cradle central plane 62C ensures that the resulting vertical bend direction 28 remains aligned with the vertical plane 22V. Turning to FIGS. 4A and 4B while continuing to refer to FIGS. 3C and 3D, bending the tube 10 creates a bend point 46 which divides the tube 10 between a bent portion 42 and a preceding portion 44. Because the vertical bend direction 28 is aligned with the vertical plane 22V, the first and second vertical alignment guides 26A, 26B remain coplanar with the vertical plane 22V throughout the bent portion 42 and the preceding portion 44, thus preventing any unintentional twisting of the tube 10.

Figure 4C:
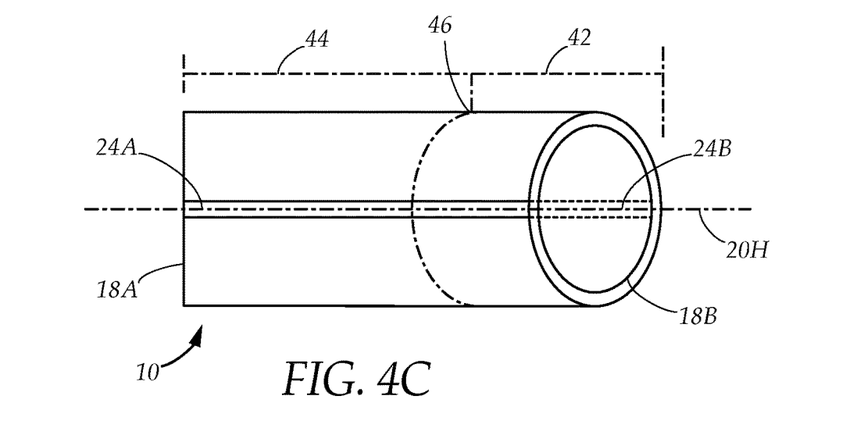
FIG. 4C is a diagrammatical side view of the tube with the tube bent in a horizontal direction, showing the horizontal alignment guides aligned with the horizontal plane, in accordance with an embodiment in the present disclosure.

Returning to FIGS. 3C and 3D while also referring to FIG. 3A, the process described above is adjusted slightly for horizontal bends. The tube 10 is positioned within the cradle recess 62R such that the vertical plane 22V, as indicated by the vertical alignment guides 26, is perpendicular to the cradle central plane 62C. The horizontal bend direction 27 will be oriented towards the cradle second end 64B. The user may then bend the tube second end 18B towards the cradle second end 64B to complete the horizontal bend. Referring to FIGS. 4A and 4C while continuing to refer to FIG. 3A, because the horizontal bend direction 27 is aligned with the horizontal plane 20H, the first and second horizontal alignment guides 24A, 24B will remain coplanar with the horizontal plane 20H throughout the bent portion 42 and the preceding portion 44.

Figure 5:
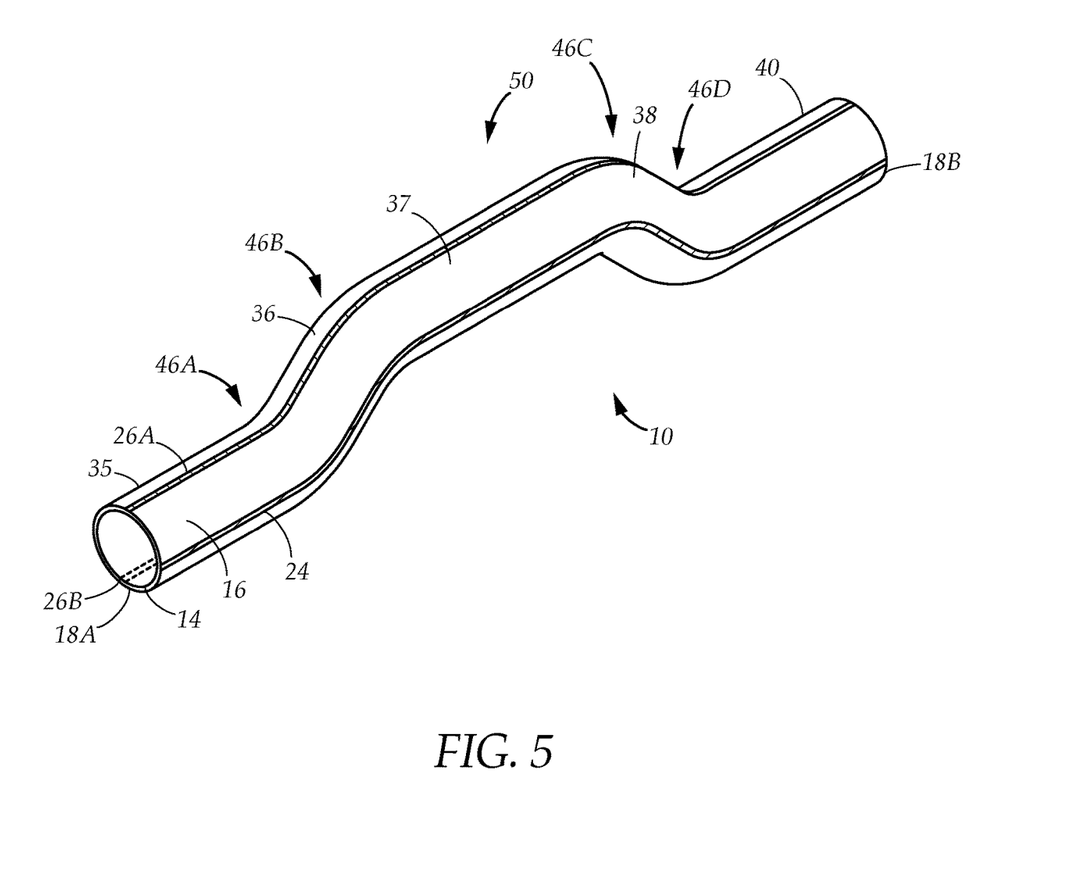
FIG. 5 is a diagrammatical perspective view of the tube with a plurality of vertical bends forming a four point saddle, in accordance with an embodiment in the present disclosure.

Turning to FIG. 5 while also referring to FIGS. 3A, 3C, and FIG. 4A, the tube 10 may be bent more than once, creating multiple bend points 46 between the tube first end 18A and the tube second end 18B. In one example, the tube 10 may be bent to create a four point saddle by making four successive vertical bends away from the horizontal plane 20H. The four successive vertical bends, comprising a first, second, third, and fourth bend 46A, 46B, 46C, 46D, are made by positioning the tube 10 such that the horizontal plane 20H is perpendicular to the cradle central plane 62C, and then bending the tube 10 in a vertical bend direction 28 pointing away from either the first vertical alignment guide 26A or the second vertical alignment guide 26B. The first bend 46A is made by bending the tube second end 18B in the direction of the first vertical alignment guide 26A to create an upward bent portion 36 between the first bend 46A and the tube second end 18B, and a first leg 35 between the first bend 46A and the tube first end 18A. The second bend 46B is made by bending the second tube end 18B in the direction of the second vertical alignment guide 26B to form an offset portion 37 which is parallel with the first leg 35. The third bend 46C is formed by bending the tube second end 18B in the direction of the second vertical alignment guide 26B, creating a downward bent portion 38 between the offset portion 37 and the tube second end 18B. Lastly, the fourth bend 46D is made by bending the tube second end 18B in the direction of the first vertical alignment guide 26A, forming a second leg portion 40 between the third bend 46C and the tube second end 18B. The second leg portion 40 is parallel with the offset portion 37. By ensuring that the first, second, third, and forth bends 46A, 46B, 46C, 46D are performed in alignment with the vertical plane 22V, any horizontal twisting of the tube 10 is prevented and the first and second vertical alignment guides 26A, 26B remain coplanar with the vertical plane 22V. Note that successive horizontal bends may be performed by employing the horizontal alignment guides 24 in the manner described herein.

Figure 6:
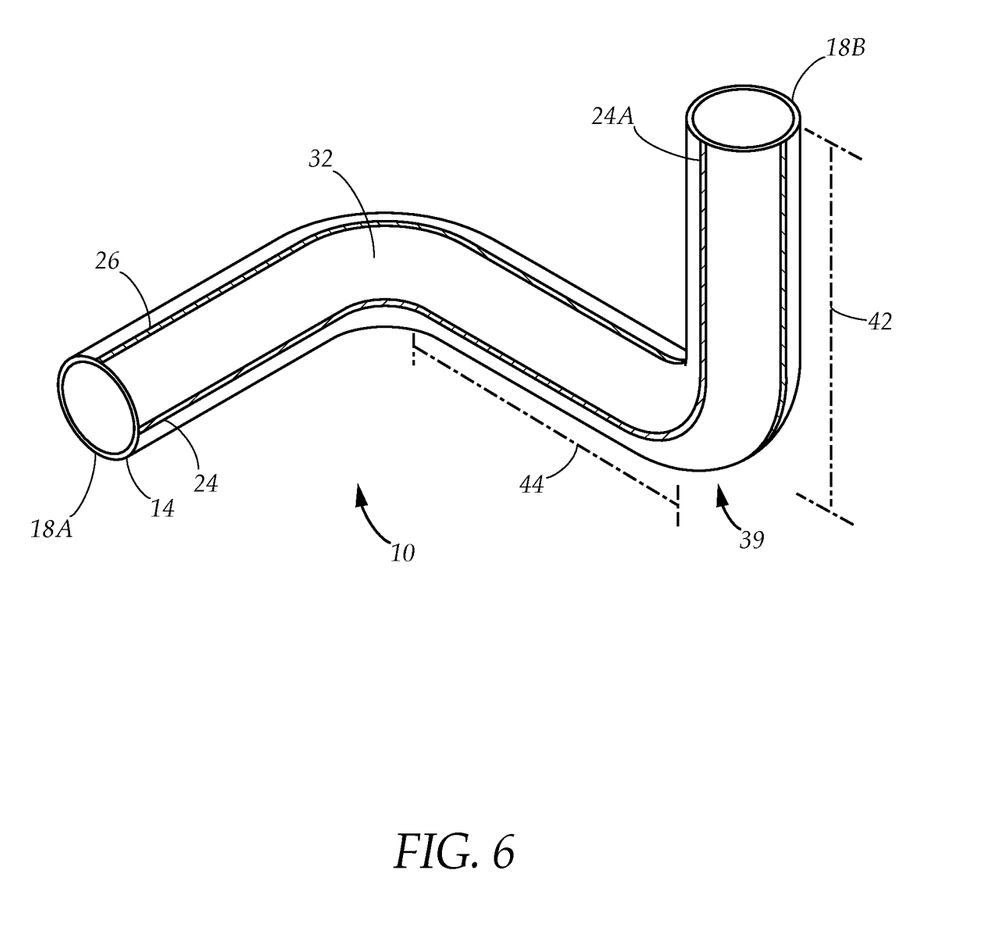
FIG. 6 is a diagrammatical perspective view of the tube bent in both the horizontal and vertical directions, in accordance with an embodiment in the present disclosure.

Turning now to FIG. 6 while also referring to FIG. 3A-C, the tube 10 may be bent in the horizontal bend direction 27 as well as the vertical bend direction 28. For example, the tube 10 may be bent in a horizontal bend direction 27 away from either the first or the second horizontal alignment guides 24A, 24B to create a first horizontal bend 32 between the first and second tube ends 18A, 18B. Next, the tube second end 18B may be bent in a vertical direction 28 away from the first vertical alignment guide 26A to create an upward bend 39. The horizontal and vertical alignment guides 24, 26 further allow the first horizontal bend 32 and the upward bend 39 to be formed at right angles. For example, the horizontal alignment guides 26 may be used to ensure that the bent portion 42 following the upward bend 39 is perpendicular to the preceding portion 44. The user may cease bending the tube 10 once the first horizontal alignment guide 24A of the bent portion 42 is perpendicular to the first horizontal alignment guide of the preceding portion 44.

Returning to FIGS. 3A, 3B and 3C, note that the horizontal and vertical planes 20H, 22V are not intended to denote the orientation or position of the tube 10 in relation to the surrounding environment in which the tube 10 may be placed, or another reference point. For example, the horizontal plane 20H does not need to be parallel with the ground. The vertical and horizontal alignment guides 24, 26 are intended to allow the tube 10 to be properly aligned in relation to the bending apparatus 60, so that the user may bend the tube 10 with precision in either the horizontal or vertical bend direction 27, 28.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a tube with horizontal and vertical alignment guides. The disclosure is illustrated by example in the drawing figures, and throughout the written description. It should be understood that numerous variations are possible, while adhering to the inventive concept. Such variations are contemplated as being a part of the present disclosure.

What is claimed is:

1. A bendable conduit for use in protecting and routing electrical wiring in buildings, comprising:
   a tube including a first open end, a second open end, the first open end opposite the second open end, an inner space extending from the first open end to the second open end, the inner space having a center point, a tube wall enclosing the inner space and extending from the first open end to the second open end, the tube wall having an outer surface and a circumference, a vertical plane extending through the center point and axially dividing the tube, a horizontal plane extending through the center point and perpendicular to the vertical plane, a pair of vertical alignment guides disposed on the outer surface, the pair of vertical alignment guides opposite each other and coplanar with the vertical plane, and a pair of horizontal alignment guides disposed on the outer surface, the pair of horizontal alignment guides opposite each other and coplanar with the horizontal plane, the tube configured to bend from the application of pressure on the tube wall between the first open end and the second open end, the pair of vertical alignment guides indicating a horizontal bend direction directed away from the vertical plane and aligned with the horizontal plane in which the tube is configured to bend, and the pair of horizontal alignment guides indicating a vertical bend direction directed away from the horizontal plane and aligned with the vertical plane in which the tube is also configured to bend.

2. The bendable conduit of claim 1, wherein the pair of vertical alignment guides comprise a first vertical alignment guide and a second vertical alignment guide separated from each other by one hundred and eighty degrees along the circumference.

3. The bendable conduit of claim 2, wherein the pair of horizontal alignment guides comprise a first horizontal alignment guide and a second horizontal alignment guide separated from each other by one hundred and eighty degrees along the circumference.

4. The bendable conduit of claim 3, wherein the first horizontal alignment guide and the second horizontal alignment guide are each interposed between the first vertical alignment guide and the second vertical alignment guide.

5. The bendable conduit of claim 4, wherein the first horizontal alignment guide and the second horizontal alignment guide are each separated from the first vertical alignment guide and the second vertical alignment guide by ninety degrees along the circumference.

6. The bendable conduit of claim 5, wherein the pair of vertical alignment guides are lines extending from the first open end to the second open end.

7. The bendable conduit of claim 6, wherein the pair of horizontal alignment guides are lines extending from the first open end to the second open end.

8. The bendable conduit of claim 7, wherein the pair of vertical alignment guides comprise a first color and the pair of horizontal alignment guides comprise a second color, thereby allowing the pair of vertical alignment guides to be visually distinguishable from the pair of horizontal alignment guides.

9. The bendable conduit of claim 8, wherein the tube comprises a material selected from the group consisting of metal, plastic, and polyvinyl chloride.

10. A method for bending a tube vertically, comprising:
    providing a tube including a first open end, a second open end, the first open end opposite the second open end, a substantially hollow tube wall extending from the first open end to the second open end, the tube wall having an outer surface and a circumference, an inner space extending from the first open end to the second open end, the inner space having a center point, a vertical plane extending through the center point and axially dividing the tube, a horizontal plane extending through the center point and perpendicular to the vertical plane, a pair of vertical alignment guides disposed on the outer surface, the pair of vertical alignment guides opposite each other and coplanar with the vertical plane, and a pair of horizontal alignment guides disposed on the outer surface, the pair of horizontal alignment guides opposite each other and coplanar with the horizontal plane, the tube wall enclosing the inner space, the tube configured to bend from the application of pressure on the tube wall between the first open end and the second open end, the vertical alignment guides indicating a horizontal bend direction directed away from the vertical plane and aligned with the horizontal plane in which the tube is configured to bend, and the horizontal alignment guides indicating a vertical bend direction directed away from the horizontal plane and aligned with the vertical plane in which the tube is also configured to bend;
    providing a bending apparatus including a cradle body having a cradle first end, a cradle second end, the cradle first end opposite the cradle second end, and a cradle recess having a concave surface facing outwardly, the cradle recess including a cradle central plane centrally dividing the cradle recess between the cradle first end and the cradle second end, the cradle recess sized to receive the tube, the cradle curved such that the cradle second end curves away from the cradle first end in a direction opposite the cradle recess;
    positioning the tube longitudinally along the cradle recess such that the first open end is oriented toward the cradle first end, the second open end is oriented toward the cradle second end, and the horizontal plane is perpendicular to the cradle central plane to orient the vertical bend direction toward the cradle second end; and
    bending the first open end towards the cradle second end.

11. A method for bending a tube horizontally, comprising:
    providing a tube including a first open end, a second open end, the first open end opposite the second open end, a substantially hollow tube wall extending from the first open end to the second open end, the tube wall having an outer surface and a circumference, an inner space extending from the first open end to the second open end, the inner space having a center point, a vertical plane extending through the center point and axially dividing the tube, a horizontal plane extending through the center point and perpendicular to the vertical plane, a pair of vertical alignment guides disposed on the outer surface, the pair of vertical alignment guides opposite each other and coplanar with the vertical plane, and a pair of horizontal alignment guides disposed on the outer surface, the pair of horizontal alignment guides opposite each other and coplanar with the horizontal plane, the tube wall enclosing the inner space, the tube configured to bend from the application of pressure on the tube wall between the first open end and the second open end, the vertical alignment guides indicating a horizontal bend direction directed away from the vertical plane and aligned with the horizontal plane in which the tube is configured to bend, and the horizontal alignment guides indicating a vertical bend direction directed away from the horizontal plane and aligned with the vertical plane in which the tube is also configured to bend;

providing a bending apparatus including a cradle body having a cradle first end, a cradle second end, the cradle first end opposite the cradle second end, and a cradle recess having a concave surface facing outwardly, the cradle recess including a cradle central plane centrally dividing the cradle recess between the cradle first end and the cradle second end, the cradle recess sized to receive the tube, the cradle curved such that the cradle second end curves away from the cradle first end in a direction opposite the cradle recess;

positioning the tube longitudinally along the cradle recess such that the first open end is oriented toward the cradle first end, the second open end is oriented toward the cradle second end, and the vertical plane is perpendicular to the cradle central plane to orient the horizontal bend direction toward the cradle second end; and bending the first open end towards the cradle second end.

* * * * *